United States Patent [19]

Hansen

[11] Patent Number: 5,087,432
[45] Date of Patent: Feb. 11, 1992

[54] METHOD FOR THE SEPARATION OF ACID FROM ACID-LADEN VAPORS

[75] Inventor: Lars J. Hansen, West Alexander, Pa.

[73] Assignee: Hansen Engineering, Inc., West Alexander, Pa.

[21] Appl. No.: 528,747

[22] Filed: May 24, 1990

[51] Int. Cl.⁵ .................. C01B 7/01; C01B 17/69; B01D 53/34

[52] U.S. Cl. .................. 423/240 R; 55/71; 55/73; 423/244

[58] Field of Search .................. 423/240, 244; 55/71, 55/73; 502/414

[56] References Cited

U.S. PATENT DOCUMENTS

| 2,397,769 | 4/1946 | Wadley | 423/240 R |
| 3,653,811 | 4/1972 | Zagorskaya et al. | 423/240 R |
| 4,399,113 | 8/1983 | Tosaka et al. | 423/240 R |
| 4,678,482 | 7/1987 | Müller et al. | 423/240 R |

FOREIGN PATENT DOCUMENTS

| 2300129 | 1/1973 | Fed. Rep. of Germany | 55/71 |
| 1055777 | 11/1974 | Japan | 55/71 |
| 2091228 | 4/1987 | Japan | 423/240 |
| 522130 | 4/1975 | U.S.S.R. | 423/240 R |

Primary Examiner—John Niebling
Assistant Examiner—Brian M. Bolam
Attorney, Agent, or Firm—Eliot S. Gerber

[57] ABSTRACT

A method and apparatus are provided for treatment of acid fumes to reduce the acid content of the fumes to meet the stringent environmental requirements. The acid fumes are treated in a packed zone containing, as the packing materials, polyester resins treated with aluminum sulfate crystals.

12 Claims, 4 Drawing Sheets

1

METHOD FOR THE SEPARATION OF ACID FROM ACID-LADEN VAPORS

FIELD OF THE INVENTION

This invention relates generally to a method for the removal of liquid droplets from a vapor stream containing such droplets. It is particularly related to a method for the treatment of moisture-laden vapors or fumes, wherein the moisture is in the form of droplets of harmful substances, such as acids, in order to render the vapors essentially free from such harmful substances before venting to the atmosphere.

The present invention also relates to an apparatus for carrying out the method of treatment of such moisture-laden vapors in order to obtain an essentially moisture-free vapor stream.

BACKGROUND OF THE INVENTION

Numerous industrial operations involve chemical or acid treatments of various materials. Often during such treatments, vapors or fumes are generated which contain acid droplets entrained therein. Other times, such fumes are generated in acid storage tanks or facilities used in such operations. When the storage tank's supply is diminished, it must be replenished with a fresh supply of acid. The added supply increases the pressure of the acid fumes within the tank and hence the fumes must be vented to the atmosphere.

In a typical industrial operation such as encountered in steel pickling, the steel is first rinsed with water and then treated with an acid such as hydrochloric acid (HCl) and rinsed again with water before it is stored for shipment. The acid treatment is typically carried out in shallow troughs or vats and generates copious amounts of fumes (acid droplets-laden vapors). Regardless of whether such fumes are generated in the acid storage tanks or during the acid-treatment (pickling) process, they contain considerable and harmful quantities of acids entrained therein. Stringent environmental regulations require that such fumes be treated so as to lower their acid content to an environmentally safe and acceptable level. In case of HCl-containing fumes, strict fume emission regulations require that the acid content does not exceed 30 part per million (ppm).

Present acid treatment facilities include complicated liquid circulation or recirculation systems which employ pumps and various auxiliary equipment. Unless these pumps and auxiliary equipment are fabricated from highly corrosion-resistant equipment, they will be corroded and damaged by the highly corrosive hydrochloric acid.

Accordingly, it is a general object of this invention to provide a method for the removal of acid droplets from vapors containing the same.

It is another object of this invention to provide such method whereby the acid content of the acid droplets-laden vapors is depleted to a level which meets the stringent environmental regulations.

It is a further object of this invention to provide an apparatus or a system for carrying out the aforementioned method without mechanical circulatory or recirculatory means such as pumps and the like.

The foregoing and other objects and features of the present invention will be more clearly comprehended from the ensuing description and the accompanying drawings.

SUMMARY OF THE INVENTION

In accordance with the present invention acid-laden fumes are treated by contacting the fumes with packing materials made of polyester resins containing aluminum sulfate crystals. Such treatment drastically reduces the acid content of the fumes so that they may be safely discharged to the atmosphere in compliance with strict environmental regulations.

In other embodiments of the invention, the acid-laden fumes may be preceded or followed by one or more packed zones containing conventional packing materials prior to contacting with the treated polyester resins packings.

DETAILED DESCRIPTION OF THE DIFFERENT EMBODIMENTS OF THE INVENTIONS

Figure 1:
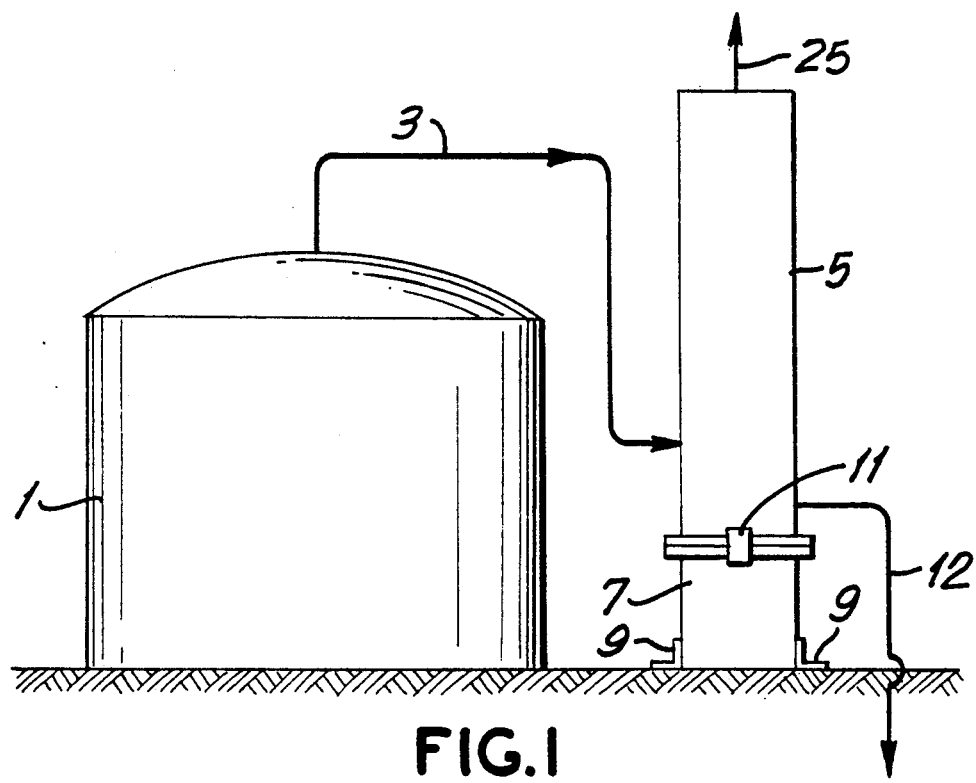
FIG. 1 is a schematic flow representation of the broad method of this invention illustrating treatment of acid fumes from an acid storage tank in a vent stack embodying the principles of the present invention.
Figure 2:
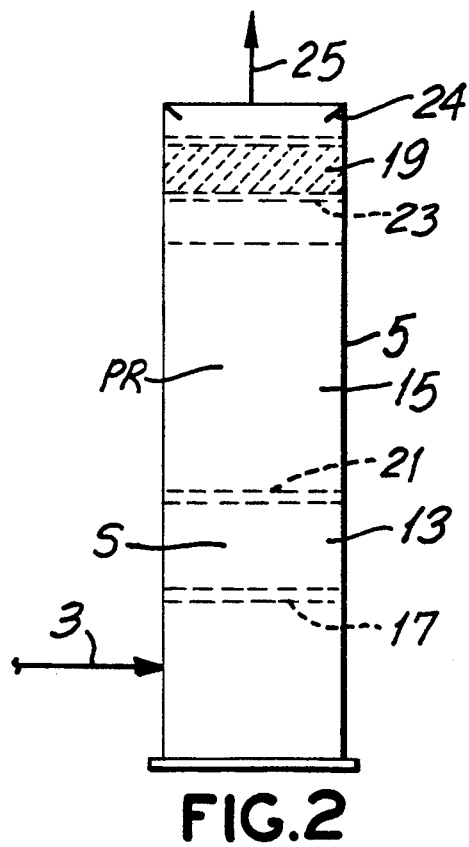
FIG. 2 is an elevational view, partly in section, showing the different interior sections of the vent stack of FIG. 1.

Referring to FIGS. 1 and 2, there is shown, in FIG. 1, an acid storage tank 1 from which the acid fumes are removed and conveyed through the conduit 3 into the scrubber or vent stack 5 wherein the acid droplets are removed from the acid fumes as hereinafter described. The vent stack 5 is supported by the supporting member or stool 7 which is secured to the ground by means of the hold down angles 9. The vent stack 5 is clamped to the stool 7 by means of the stack hold down clamp 11.

The vent stack 5 which serves as a scrubber to remove the acid droplets from the acid tank effluent comprises a lower packed zone 13, an intermediate packed zone 15 and a demister 19 near the top of the vent stack 5 as shown in FIG. 2. The lower packed zone 13 is packed with packing materials such as saddles S (berl saddle, pall rings and tellerettes) supported by the packings support plate 17. It has been discovered that the acid absorption efficiency, and hence the efficiency of acid removal from the acid tank effluent can be remarkably improved by using, as the packing materials, saddles made of polyester resin containing from about 1 to about 40 weight percent aluminum sulfate crystals [$Al_2(SO_4)_3$].18 $H_2O$.

Polyester resins are well known and may be obtained from several sources. Examples of polyester resins are Atlac 382 available from the Reichold Chemical Co., Pittsburgh, PA Koppers 7000 available from the Richold Chemical Co., Pittsburgh, PA Pittsburgh, PA. The polyester resins are compounded in the usual way with the aluminum sulfate crystals.

Such saddles are highly hydroscopic and serve to considerably increase the absorption of the acid on the surface of the packing material and hence facilitate the removal of acid droplets from acid-laden fumes. Most of the acid in the acid fumes is removed in the packed zone 13 of the vent stack 5 and, therefore, this zone is the primary acid removal packed zone. The moisture (water) from the acid accumulates in the bottom of the vent stack 5 and is withdrawn via condensate line 12.

In order to further improve the efficiency of acid removal from the acid fumes as the fumes ascend through the vent stack 5, the vent stack is provided with the intermediate packing zone 15 which is packed with packing materials such as pall rings PR, saddles or tellerettes. The pall rings PR are supported by the support plate 21 disposed above the saddles S in the packed zone 13. The pall ring packing materials used herein are made of polypropylene although they may be fabricated from other materials such as, for example, polyethylene and teflon. If desired, the intermediate packed zone 15 may be packed with the saddles S in lieu of, or in admixture with the polypropylene pall rings.

For even more improved efficiency of acid removal, a demister 19 is provided above the packing zone 15. The demister 19 may be fabricated from polypropylene or other suitable materials such as, for example, polyethylene and teflon, and is supported in the vent stack 5 on a demister support grid 23.

Thus, the acid fumes from the acid tank 1 are contacted, in the vent stack 5, with one or more packed zones, wherein the acid droplets entrained in the acid fumes are absorbed by the packing materials in the vent stack thus denuding the fumes from the acid contained therein. The essentially acid-free vapors can thus be safely vented from the vent stack 5 through the vent line 25 into the atmosphere. A final 45° wiper ring at top of stack will prevent any residual droplets on the stack wall to be forced out (24).

Figure 3:
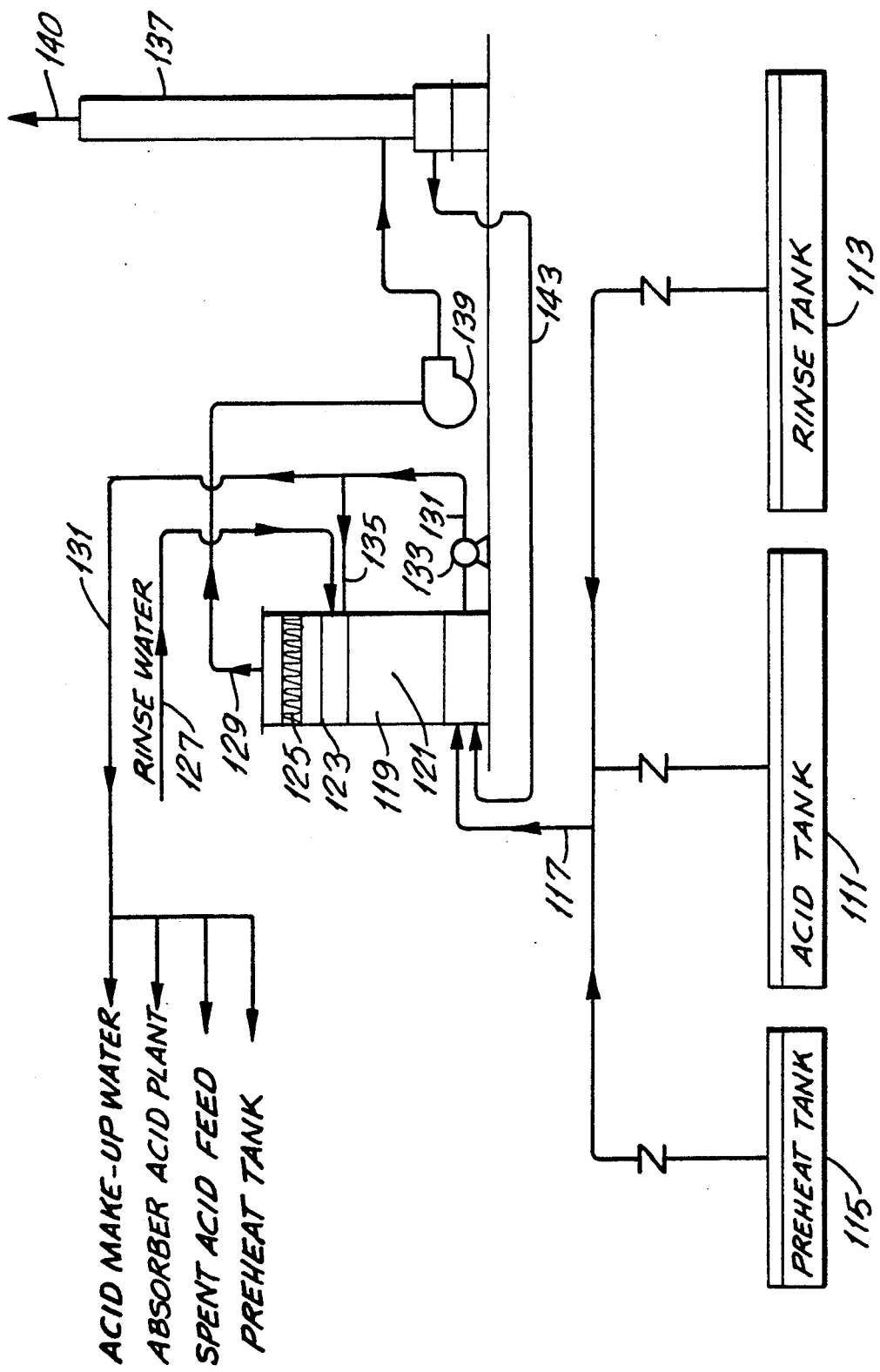
FIG. 3 is a schematic flow representation of a different embodiment of the present invention.

Referring to FIG. 3, there is shown a steel pickling assembly comprising an acid tank 111, a rinse tank 113 and a preheat tank 115. Steel is pickled in the acid tank 111 generating acid fumes which are removed through the acid fume conduit 117 and introduced into a first packed scrubber 119. The first packed scrubber 119 is of conventional construction and operation and includes a primary packed zone 121, a secondary packed zone 123 and a demister 125 made of polypropylene or some other suitable material. The packing materials in the packed zones 121 and 123 may be the usual type of packings such as pall rings and tellerettes. In the packed scrubber 119, the acid fumes are contacted with a countercurrent stream of rinse water as the fumes travel through the channels between the packing materials and ascend through the packed scrubber 119. The rinse water is conducted through the rinse water line 127 and is introduced into the packed scrubber 119 above the packed zone 121. The rinse water-treated acid fumes leaving the packed zone 121 are further contacted with packing materials in the packed zone 123 and the demister 125 and thereafter leave the packed scrubber 119, through the conduit 129. Spent acid water is withdrawn from the packed scrubber 119 via the conduit 131, and is pumped through this line via the pump 133 to an acid make-up water system. Part of this acid water is returned to the packed scrubber 119 through the conduit 135 below the entry point of the rinse water line 127 and further aids the scrubbing efficiency in the packed zone 121. The remaining acid water is conducted to an acid make-up water vessel (not shown) via line 131.

Frequently, treatment of the acid fumes in a conventional scrubber such as the packed scrubber 119 does not reduce the acid level of the fumes sufficiently for safe discharge into the atmosphere. Such fumes often contain high levels of acid (HCl) considerably exceeding the 30 ppm level required by environmental regulations. Therefore, and in accordance with the second embodiment of the present invention, the acid fumes effluent from the packed scrubber 119 is further treated in the vent stack 137. The acid fumes effluent from the packed scrubber 119 are thus withdrawn via the conduit 129 through which they are conducted, by the aid of a blower 139, if desired, into the vent stack 137. The vent stack 137 is of the same construction and operation as the vent stack 5 described in connection with FIGS. 1 and 2. Accordingly, its operation will not be repeated. After treatment of the effluent from the packed scrubber 119 in the vent stack 137, the acid-free vapors from the vent stack 13 are discharged or vented into the atmosphere through the conduit 140. The spent acid water removed in the vent stack 137 is withdrawn through the spent acid water drain line 143 and is returned to the packed scrubber 119 below the packed zone 121 and is treated in this scrubber along with the acid fumes from the acid tank 111.

The treatment of the acid fumes by the method described in connection with FIGS. 1-3 will generally reduce the acid content of the fumes to approximately 5 ppm. Sometimes, however, larger quantities of fumes must be treated and/or greater reduction of acid level of the discharged vapors maybe desired or even mandated by environmental regulations. Accordingly, the third embodiment of the invention is designed to achieve the foregoing objectives.

Figure 4:
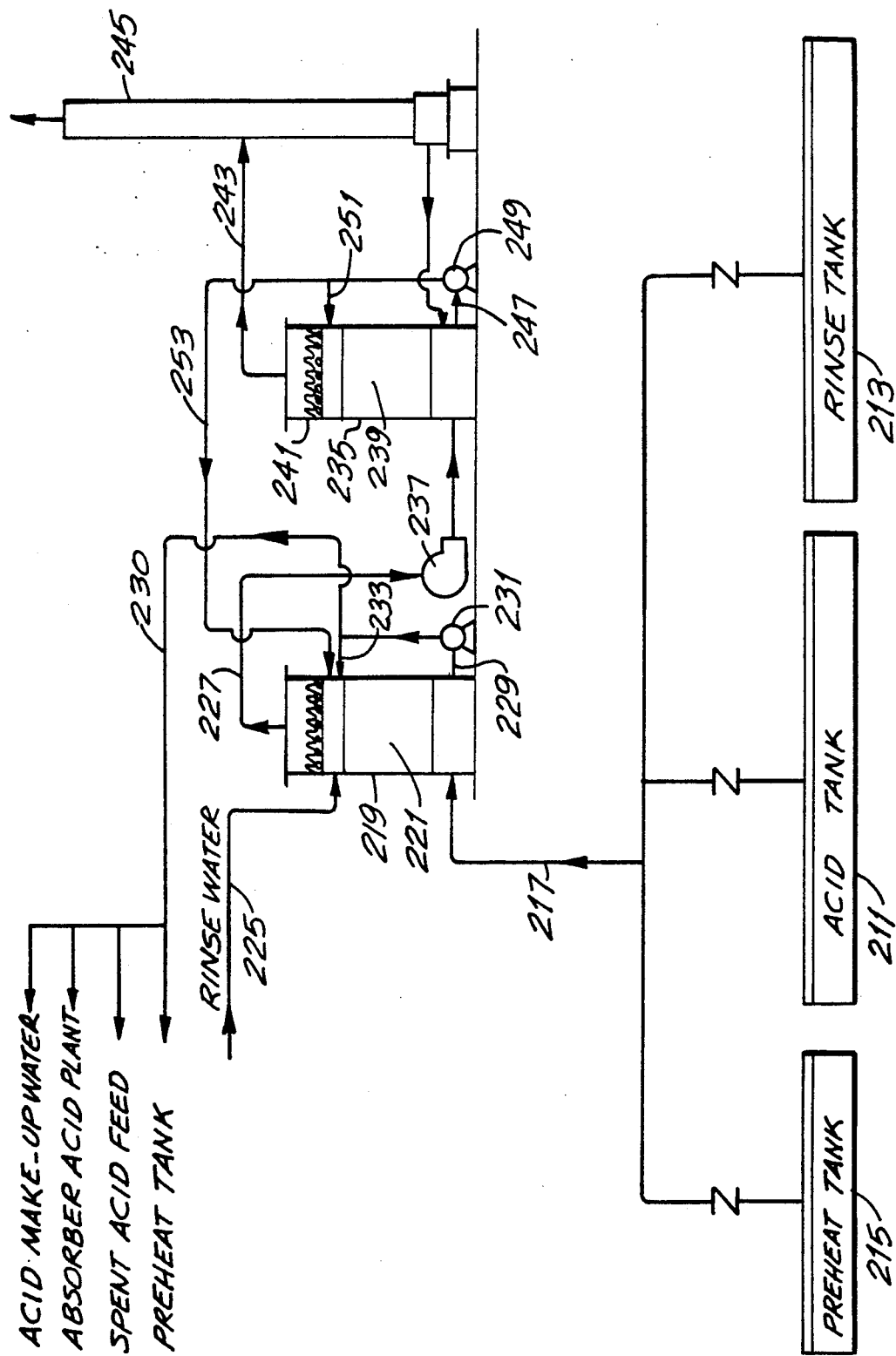
FIG. 4 is a schematic flow representation of yet another embodiment of this invention.

Thus, referring to FIG. 4, and again referring to a steel pickling operation comprising an acid tank 211, a rinse tank 213 and a preheat tank 215, the acid fumes are conducted through the acid fume conduit 217 and introduced into a packed scrubber 219 which is of conventional design and operation. The packed scrubber 219 contains a packed zone 221 and a demister 223 made of polypropylene or some other suitable material. The packing materials in the packed zone 221 may be the usual type of packings such as pall rings, saddles and tellerettes. Thus, in the packed scrubber 219 the acid fumes are contacted with a countercurrent stream of rinse water as the fumes work their way through the channels between the packing materials and ascend through the packed scrubber 219. The rinse water is introduced into the packed scrubber 219 through the rinse water line 225 at a point above the packed zone 221. The rinse water-treated acid fumes leaving the packed zone 221 are further contacted with the demister 223 and thereafter exit from the packed scrubber 219 via the conduit 227. Spent acid water is withdrawn from the packed scrubber 219 through the conduit 229 and is pumped through this conduit by the pump 231 to an acid make-up water system through line 230. Part of the acid water is returned to the packed scrubber 219 through the conduit 233 as shown in FIG. 4.

The effluent from the packed scrubber 219 is conducted through the conduit 227 into a second packed scrubber 235, with the aid of the blower 237, if desired. The packed scrubber 235 also contains packing materials in a packed zone 239 and a polypropylene demistor 241 as in the packed scrubber 219. After passing through the packed zone 239 and the demister 241, the treated fumes are withdrawn via conduit 243 and introduced into the vent stack 245. The spent acid water from the packed scrubber 235 are withdrawn through line 247 and returned by means of the pump 249, partly to the packed scrubber 235 via line 251 and partly to the packed scrubber 219 via line 253, as shown in FIG. 4.

The effluent from the packed scrubber 235 is treated in the vent stack 245 in substantially the same manner as hereinbefore described in connection with the description of the vent stacks in FIGS. 1 and 2. The vent stack bottoms are withdrawn through line 255 and are returned to the packed scrubber 235.

As it can be seen from the foregoing description of the different embodiments of the invention, the method and system described herein are capable of treating acid-laden fumes to remove the acid so that the fumes can be discharged into the atmosphere without adverse environmental impacts. No pumps are required to recirculate over the packing materials in the packed zone to absorb the HCl as is usually necessary in conventional acid recovery systems.

In order to improve the acid absorption of the packings, the system may be washed one or more times with a calcium chloride solution. This treatment helps improve the overall moisture absorption and hence increases the amount of acid removed from the acid fumes.

The process parameters may vary depending, among other things, on the concentration of the acid in the acid fume, the volume of the acid fumes being treated and the desired level of acid reduction. The temperature in each scrubber and in the vent stack may also vary in the different embodiments. Thus, when the acid fumes are treated by the method illustrated in FIG. 1, the temperature in the vent stack 5 may be maintained between at ambient temperatures and atmospheric pressure. In the embodiment shown in FIG. 3, the temperature in the packed scrubber 119 may be maintained between about 140 to about 200° F. and the temperature at the vent stack may be between about 100 and about 140° F. Both the packed scrubber 119 and the vent stack 137 are conveniently maintained at about atmospheric pressure.

In the embodiment illustrated in FIG. 4, the first scrubber is maintained at a temperature between about 140 and about 200° F., and the second scrubber is maintained at a temperature of from about 120 to about 180° F., both at approximately atmospheric pressure. The vent stack 245 is maintained at approximately atmospheric pressure and a temperature between about 100 and about 140° F.

As previously mentioned, the increased efficiency of acid removal in the method of this invention is due, in large measure, to the use of the novel treated packing saddles in the vent stack. The use of saddles made of polyester resin containing from about 5 to about 40 weight percent of aluminum sulfate crystal results in remarkable increase in acid removal from the acid fumes due to high degree of acid absorptivity of these treated saddles.

Figure 5:
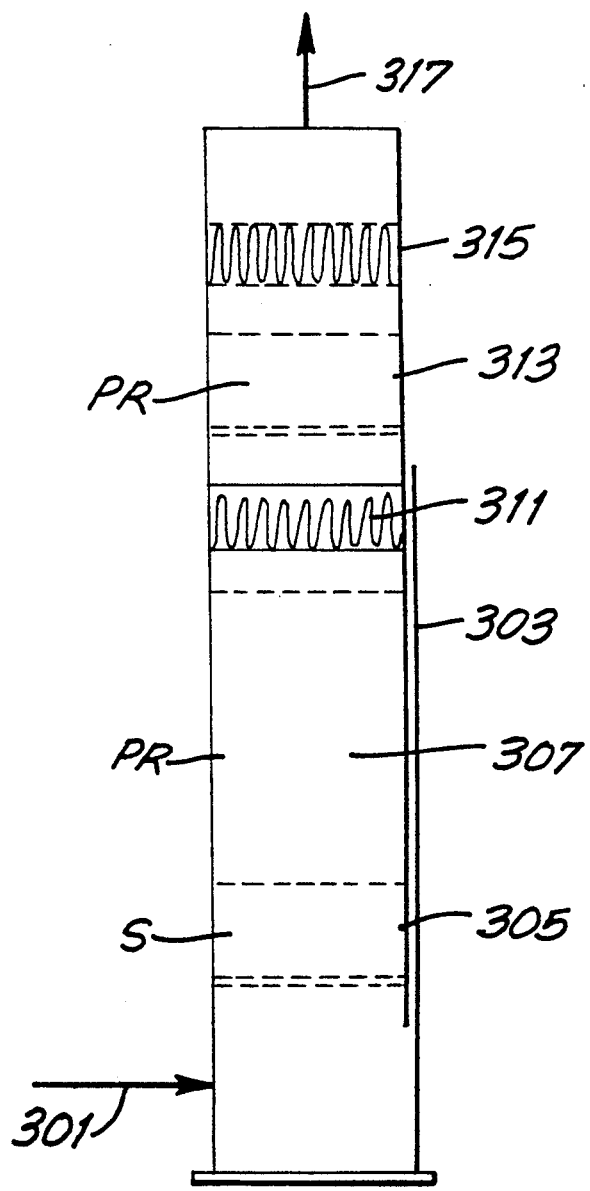
FIG. 5 is a view similar to FIG. 1 when the vent stack is used for treatment of sulfuric acid-laden fumes.

The vent stack shown in FIG. 5 is particularly effective for the treatment of sulfuric acid-laden vapors. As show in this figure, the sulfuric acid tank effluent is introduced via line 301 to the vent stack 303 where it ascends through a first zone 305 packed with saddles S followed by a second zone 307 packed with pall rings PR. Spaced above the packed zone 307 is the demister 311 followed by a third packed zone 313 and finally a demister 315. The treated vapor effluent leaves the vent stack 303 via the conduct 317. The packing materials and the demisters in the vent stack 303 are the same as those heretofore described in connection with FIG. 2.

While the present invention has been illustrated primarily in connection with the removal of hydrochloric acid encountered in pickling operations, the method and system described herein are applicable to removal of other acids generated in various industrial operations. Also, several changes and modifications may be made in the operation described herein. Such changes and modifications however are within the scope and contemplation of this invention.

I claim:

1. A method for the removal of hydrochloric or sulfuric acid from vapor laden with said acid which comprises contacting said acid-laden vapors with packing materials in a zone containing said packing materials wherein said packing materials are formed of polyester resin containing from about 5 to 40 weight percent aluminum sulfate crystals.

2. A method as in claim 1 wherein said zone is maintained at a temperature of from about 140 to about 200° F.

3. A method for the removal of hydrochloric or sulfuric acid from vapors laden with said acid which comprises:
   a) contacting said acid-laden vapors with water in a first packed zone containing packing materials,
   b) withdrawing the treated vapors from said first packed zone and contacting said treated vapors with packing materials in a second packed zone, wherein said materials in said second packed zone are formed of polyester resin containing from about 5 to about 40 weight percent aluminum sulfate crystals, and
   c) withdrawing essentially acid-free vapors from said second packed zone.

4. A method as in claim 3 wherein acid rinse water is withdrawn from the bottom of said first packed zone and partially recycled to said first packed zone above said packing materials.

5. A method as in claim 3 wherein the temperature is said first packed zone is from about 140 to about 200° F. and the temperature in said second packed zone is from about 100 to about 140° F.

6. A method as in claim 4 wherein the temperature in said first packed zone is from about 140 to about 200° F. and the temperature in said second packed zone is from about 100 to about 140° F.

7. A method for the removal hydrochloric or sulfuric acid from vapors laden with said acid which comprises:
   a) contacting said acid-laden vapors with water in a first packed zone containing packing materials,
   b) withdrawing the treated vapors from said first packed zone and contacting said treated vapors with packing materials in a second packed zone containing packing materials,
   c) withdrawing the treated vapors from said second packed zone and contacting said treated vapors with packing materials in a third packed zone containing packing materials, wherein said packing materials in said third packed zone are formed of polyester resin containing from about 5 to about 40 weight percent aluminum sulfate crystals, and
   d) withdrawing essentially acid-free vapors from said third packed zone.

8. A method as in claim 7 wherein acid rinse water is withdrawn from the bottom of said first packed zone and partially recycled to said first packed zone above said packing materials.

9. A method as in claim 8 wherein acid rinse water is withdrawn from the bottom of said second packed zone and partially recycled to said second packed zone above said packing materials.

10. A method as in claim 7 wherein the temperature in said first packed zone is from about 140 to about 200° F., the temperature in said second packed zone is from about 120 to about 180° F., and the temperature in said third packed zone is from about 100 to about 140° F.

11. A method as in claim 8 wherein the temperature in said first packed zone is from about 140 to about 200° F., the temperature in said second packed zone is from about 120 to about 180° F., and the temperature in said third packed zone is from about 100 to about 140° F.

12. A method as in claim 9 wherein the temperature in said first packed zone is from about 140 to about 200° F., the temperature in said second packed zone is from about 120 to about 180° F., and the temperature in said third packed zone is from about 100 to about 140° F.

* * * * *